United States Patent Office 3,308,969
Patented Mar. 14, 1967

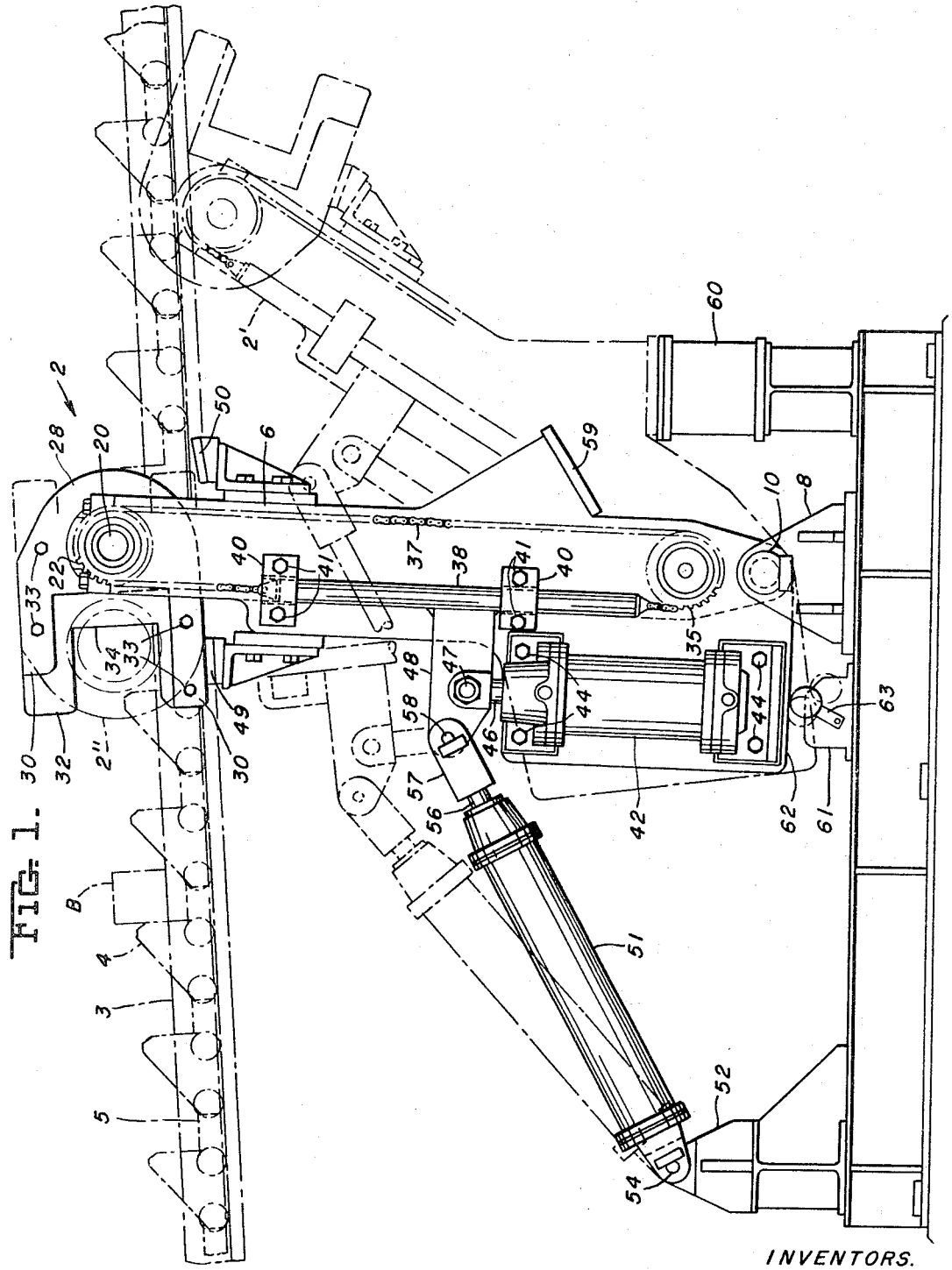

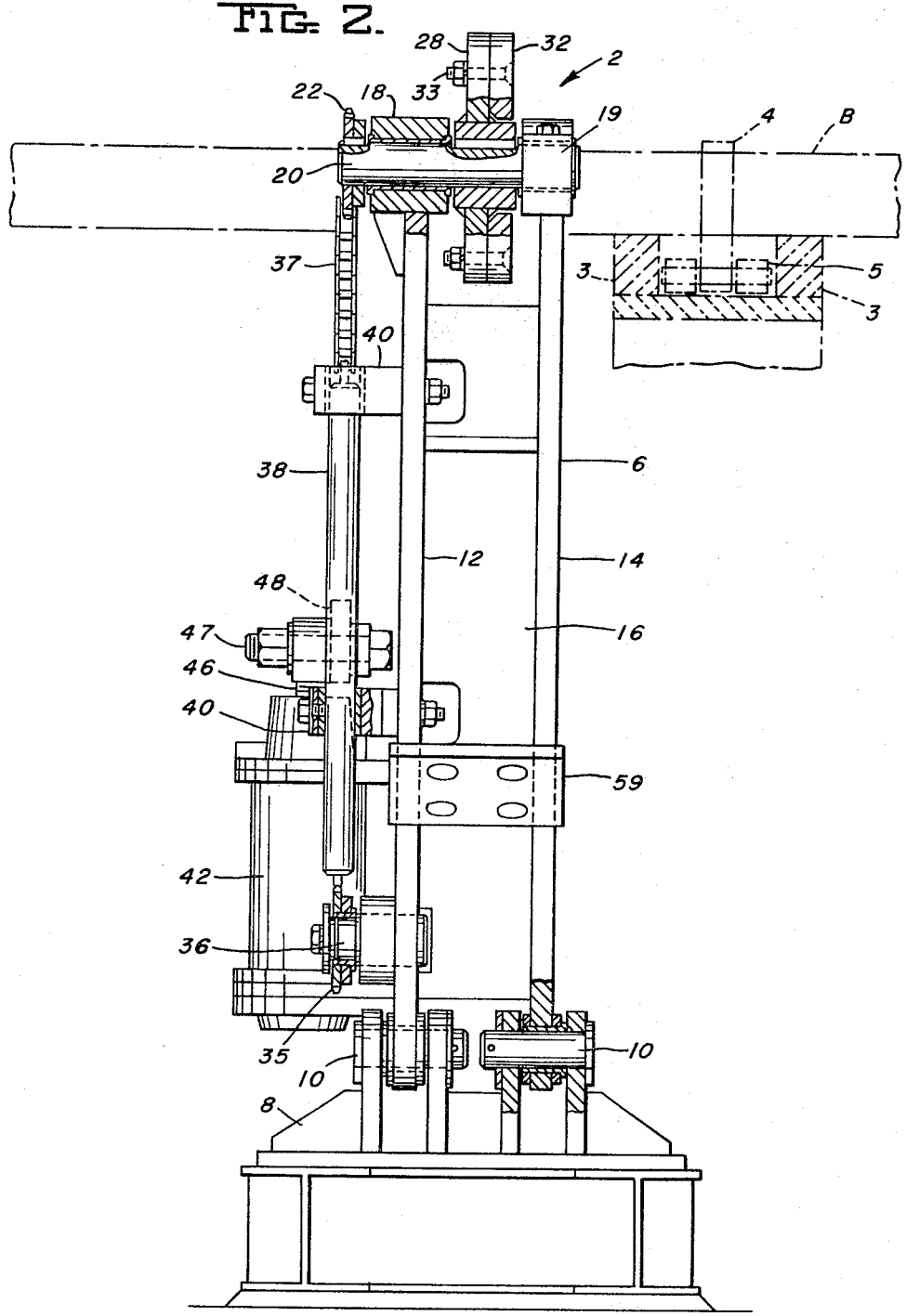

3,308,969
BAR TURNER
Dyke B. Orms and Leonard I. Rauch, Johnstown, Pa., assignors to United States Steel Corporation, a corporation of Delaware
Filed Aug. 11, 1965, Ser. No. 478,823
5 Claims. (Cl. 214—1)

This invention relates to apparatus for turning over bars, beams, or other similar objects. The objects turned may be of any shape or size, or of any material.

The common apparatus for turning bars has been a series of "star wheels" mounted on a rotatable shaft. The shaft is supported so that it extends across a conveyor table carrying the bars to be turned and is parallel to these bars. A bar to be turned is fed laterally into one recess of each star wheel, and the shaft is then rotated to carry the bar up and over the wheels. The bar is deposited on the table on the other side of the star wheels after having been turned 180°.

There are a number of disadvantages to the foregoing "star wheel" apparatus. One is that each bar must properly engage all the star wheels simultaneously, which means that as the bar engages the wheels, it must be aligned so that it is exactly parallel with the supporting shaft. This is difficult to accomplish, particularly with the longer bars and with bars that are bent. In fact, bent bars are usually impossible to be fed so that they engage all the star wheels properly. Another disadvantage is that when the star wheel apparatus fails to turn a bar, either because it is bent or not aligned properly or because the star wheels did not index to the proper position for receiving the bar, the resultant jamming of the bar against the star wheels can damage both the bar and the apparatus. A further disadvantage is that it is difficult to design an economical "star wheel" apparatus that can be retracted from the bar conveyor table when it is desired that some of the bars on the table by-pass the apparatus.

With the apparatus of our invention, bars may be easily turned over, even though they are bent or enter the turning device at an angle. The apparatus is simpler and more compact than the star wheel type, since a bar need be held in only one place along its length while it is being turned. This is due to the ability of theh apparatus to turn a bar without causing a substantial lateral movement of the portion of the bar contacted by the apparatus. Thus, after it is turned, the bar remains throughout its entire length in substantially the same place on the table and at the same angle with respect to the table as it was before it was turned, even though the bar was held in only one place.

Another advantage of the disclosed apparatus is that when a bar is jammed against the apparatus, means are provided for sensing this condition and for shutting down the conveyor which feeds the bars into the turning device. This prevents excessive damage to both the bars and apparatus when jamming occurs. Also, means are provided at a low cost for retracting the apparatus when it is desired that it be by-passed. In fact, the entire cost of making this new apparatus is less than the prior "star wheel" type, and its installation and maintenance costs are considerably lower.

Thus, an object of our invention is to provide a new apparatus for turning over bars which will be of a simpler, more compact structure than prior turning devices.

Another object of the invention is to provide a turning apparatus that will accept and turn all bars that are fed to it within a wide tolerance of bar alignments and also will possess all of the other mentioned advantages.

These and other objects will appear more readily from the following detailed description of our invention and the attached drawings in which:

FIGURE 1 is a side elevation of our apparatus for turning over bars; and

FIGURE 2 is an end elevation of the apparatus of FIGURE 1.

Referring to FIGURE 1, a bar turning apparatus 2 is placed next to one of a series of parallel skids 3, which carries a bar B to be turned. The apparatus 2 is located approximately midway along the length of the bar. Dogs 4 are mounted on an endless conveyor chain 5, and the bar B is moved over skids 3 by one of these dogs and other dogs on conveyor chains parallel to the chain 5.

The main part of the apparatus 2 consists of an arm 6 that is pivotally connected to a base support 8 by pins 10. As shown in FIGURE 2, the arm 6 is made of a front plate 12, a rear plate 14, and a web plate 16, and the pins 10 fit through the lower ends of plates 12 and 14.

Bushings 18 and 19 are welded to the tops of plates 12 and 14, and a shaft 20 is rotatably supported within these bushings. The shaft 20 carries an upper sprocket 22 that is keyed to its front end and a bar turning member 28 that is keyed to the central portion of the shaft between bushings 18 and 19.

As shown in FIGURE 1, the bar turning member 28 has prongs 30, and a template 32 is bolted to these prongs by bolts 33. Inner edge 34 of template 32 has a shape corresponding to the shape of the bar to be turned, and the template may be replaced by another of a different shape when a bar of a different size or shape is to be turned.

At the bottom end of arm 6, a lower sprocket 35 is rotatably mounted on a stub shaft 36, which is in turn secured to the front plate 12.

A chain 37 turns around the upper and lower sprockets 22 and 35, and the ends of this chain are connected to opposite ends of a follower rod 38. Bushing blocks 40, which are secured to the plate 12 by bolts 41, house the follower rod 38 and permit it to slide vertically.

The follower rod 38 is moved by an air cylinder 42, which is bolted to the plate 12 by bolts 44. Piston rod 46 extends upward from the cylinder 42 and is pivotally connected by a bolt 47 to a bracket 48. The bracket 48 is in turn welded to the follower rod 38. Thus, when the cylinder 42 is actuated to move the piston rod 46 upward, the follower rod 38 moves upward, causing the chain 37 to rotate the upper sprocket 22, shaft 20, and the connected bar turning member 28. Padded stops 49 and 50 are mounted on either side of the arm 6 and by their engagement with the turning member 28, they limit its arc of travel.

Another air cylinder 51 is pivotally connected at one end to a second base support 52 by a pin 54. From the other end of the cylinder 51 extends a piston rod 56 with a clevis 57 that is pivotally connected to the bracket 48 by a pin 58. When the cylinders 51 and 42 are actuated to move their respective piston rods upward, the apparatus 2 swings to its chain-line position 2' (FIGURE 1), thus moving the bar turning member 28 out of the path of the bars B on skids 3 and allowing these bars to bypass the turning apparatus. A plate 59 is mounted on the rear side of arm 6, and when the apparatus 2 is swung to its by-pass position 2', the plate 59 rests on a stop support 60.

A limit switch 61 is provided beneath the lower edge 62 of arm 6. The switch 61 has a spring-loaded lever arm 63 in contact with the edge 62, and the switch is connected to the drive for conveyor chains 5 (not shown) in a manner such that the drive is shut off when the lever arm 63 is allowed to rotate upward. This occurs whenever edge 62 of arms 6 is rotated upward. If a bar B is forced against the turning member 28 without the conveyor drive being shut off by the operator, the bar will force the arm 6 to rotate clockwise (FIGURE 1), forcing some air out of cylinder 51, which acts as a shock absorber, and allowing the lever arm 63 to move upward. This will shut off the conveyor drive and prevent damage to the bar B and the apparatus 2.

In operation, a bar B (FIGURE 1) is moved over skids 3 by dogs 4 until it engages edge 34 of template 32 on the bar turning member 28. Only one bar turning apparatus is needed along the length of the bar; so there is no problem of aligning the bar so that it will engage a series of turning members simultaneously. When the bar is fully between the prongs 30 of turning member 28, the operator shuts off the conveyor drive means. In the event the operator fails to shut off the drive means, the bar B will push the arm 6 slightly to the right (FIGURE 1), forcing a small amount of air out of cylinder 51. This will trip the limit switch 61 underneath the arm 6, thereby shutting off the conveyor drive and preventing damage to the bar and the apparatus.

The operator turns the bar over by operating the air cylinder 42 to push the piston rod 46 upward. The connected follower rod 38 is thus moved upward and the chain 37 is driven around sprockets 22 and 35. The rotation of upper sprocket 22 lifts the turning member 28 upward and off the padded stop 49. Meanwhile, the piston rod 56, which extends from cylinder 51 and is also connected to the bracket 48 on the follower rod 38, remains retracted, thus pulling the arm 6 toward the base support 52 as the follower rod 38 moves upward. With the arm 6 rotating to the left, as viewed in FIGURE 1, while the turning member 28 mounted on the arm 6 rotates to the right, the bar B held by the member 28 is given a turning motion that maintains it in almost the same lateral position after it is turned as before it was turned. The motion of all parts of the apparatus 2 is stopped by the turning member 28 contacting the stop 50, and the final position of the apparatus 2 after the bar is turned is illustrated by the chain-line position of the apparatus 2" in FIGURE 1.

The ends of the bar B will not turn as quickly as the central portion of the bar near the turning apparatus 2, but they will lag in their turning and will cause a momentary twisting of the bar. However, this will not result in the bar becoming askew on the skids, since the bar is turned with almost no lateral advancement on the skids, and thus all portions of the bar remain in approximately the same lateral position regardless of what stage of turning they are undergoing. Because of this feature, additional bar turning devices are not needed along the length of the bar to prevent the bar from becoming askew.

When the bar B has been turned over, the drive for conveyor chains 5 is turned on again and the bar is carried away on skids 3 by the dogs 4. The cylinder 42 is operated to pull the piston rod 46 downward so as to rotate the turning member 28 back to its original position resting on stop 49, where it is ready to receive another bar to be turned. If it is desired that the next bar or object on the conveyor skids 3 not be turned, both the cylinder 51 and the cylinder 42 are actuated to extend their respective piston rods to move the apparatus 2 to its chain-line position 2', where it is out of the way of the objects travelling on skids 3.

While one embodiment of our invention has been shown and described, it will be apparent that adaptations and modifications may be made without departing from the scope of the appended claims.

We claim:

1. Apparatus for turning over bars comprising two spaced-apart stationary base supports, a main arm pivotally connected at a first pivotal axis to one of said base supports, a bar turning member extending from said arm and rotatably mounted on the arm at a second pivotal axis, a follower member mounted on said arm and movable with respect to the arm, means connecting said follower member to said bar turning member causing said bar turning member to rotate about said second pivotal axis when said follower member is moved with respect to said arm, a link having one end pivotally connected to said follower member and its other end pivotally connected to the second of said base supports, and means for moving said follower to cause the simultaneous rotation of said arm and said bar turning member about said first and second pivotal axes respectively.

2. Apparatus for turning over bars comprising two spaced-apart stationary base supports, a main arm pivotally connected at a first pivotal axis to one of said base supports, a bar turning member extending from said arm and rotatably mounted on the arm at a second pivotal axis, a follower member slidably mounted on said arm, means connecting said follower member to said bar turning member causing the bar turning member to rotate about said second pivotal axis when said follower member is moved with respect to said arm, means for moving said follower member to cause the rotation of said bar turning member, and a link having one end pivotally connected to said follower member and its other end pivotally connected to the second of said base supports, said link being positioned so as to rotate said arm about said first pivotal axis and toward said second base support in reaction to the rotation of said link when said follower member is moved to rotate said bar turning member from the side of said arm facing said second base support to the side of said arm facing away from said second base support.

3. Apparatus of claim 2 wherein said means connecting said follower member to said bar turning member includes a sprocket centered on said second pivotal axis and connected to said bar turning member so as to rotate with the member, and a chain engaging said sprocket and connected to said follower member so as to rotate the sprocket and attached bar turning member when said follower member is moved with respect to said arm.

4. Apparatus for turning over bars that are placed upon a conveyor table equipped with means for moving bars thereacross, said apparatus comprising two spaced-apart stationary base supports, a main arm pivotally connected at a first pivotal axis to one of said base supports, a bar turning member extending from said arm and rotatably mounted on the arm at a second pivotal axis, a follower member slidably mounted on said arm, means connecting said follower member to said bar turning member causing the bar turning member to rotate about said second pivotal axis when said follower member is moved with respect to said arm, means for moving said follower member to cause the rotation of said bar turning member, a link adjustable in length and having one end pivotally connected to said follower member and its other end pivotally connected to the second of said base supports, said link being positioned so as to rotate said arm about said first pivotal axis and toward said second base support in reaction to the rotation of said link when said follower member is moved to rotate said bar turning member from the side of said arm facing said second base support to the side of said arm facing away from said second base support, means for maintaining the length of said link so as to hold said bar turning member on said arm on a level with the bars on said table, and means for changing the length of said link to swing said arm about said first pivotal axis and carry said bar turning member away from said table.

5. Apparatus of claim 4 wherein said means for changing the length of said link includes an air cylinder forming a part of said link, said cylinder acting as a shock absorber and permitting said arm to pivot slightly when a bar is forced against said bar turning member without the stopping of said means for moving the bar across the table, said apparatus also including a switch mounted adjacent said arm and operative in response to said slight pivoting of the arm to stop said bar driving means.

References Cited by the Examiner
UNITED STATES PATENTS 1,164,277  12/1915  Forsstrom _____ 198—33
2,669,140  2/1954  Wood _____ 214—1

MARVIN A. CHAMPION, *Primary Examiner.*